United States Patent
Klesing

(10) Patent No.: US 10,752,282 B2
(45) Date of Patent: Aug. 25, 2020

(54) TRIPLE REDUNDANCY FAILSAFE FOR STEERING SYSTEMS

(71) Applicant: STEERING SOLUTIONS IP HOLDING CORPORATION, Saginaw, MI (US)

(72) Inventor: Joachim J. Klesing, Rochester, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 286 days.

(21) Appl. No.: 15/724,415

(22) Filed: Oct. 4, 2017

(65) Prior Publication Data

US 2019/0100237 A1    Apr. 4, 2019

(51) Int. Cl.
*B62D 5/04* (2006.01)

(52) U.S. Cl.
CPC ......... *B62D 5/0484* (2013.01); *B62D 5/0481* (2013.01); *B62D 5/0493* (2013.01)

(58) Field of Classification Search
CPC ... B62D 5/0484; B62D 5/0493; B62D 5/0481
See application file for complete search history.

(56) References Cited

U.S. PATENT DOCUMENTS

| | | | | |
|---|---|---|---|---|
| 4,949,119 A * | 8/1990 | Moncrief | ................. | G09B 9/05 273/148 B |
| 5,823,876 A * | 10/1998 | Unbehand | ............... | A63F 13/06 463/37 |
| 6,394,218 B1 * | 5/2002 | Heitzer | ................. | B62D 5/003 180/402 |
| 6,548,969 B2 * | 4/2003 | Ewbank | ................. | B62D 5/003 180/402 |
| 10,513,286 B1 * | 12/2019 | Stoffel | .................... | B62D 1/26 |
| 2003/0098197 A1 * | 5/2003 | Laurent | ................. | B62D 5/003 180/401 |
| 2008/0254417 A1 * | 10/2008 | Mohamed | .............. | G09B 19/14 434/69 |
| 2010/0216097 A1 * | 8/2010 | Romagnoli | .............. | G09B 9/02 434/35 |
| 2012/0295230 A1 * | 11/2012 | Esposito | .................. | G09B 9/04 434/69 |
| 2015/0158499 A1 * | 6/2015 | Koravadi | .................. | B60T 7/12 701/23 |
| 2017/0158222 A1 * | 6/2017 | Schulz | ................... | B62D 5/006 |
| 2018/0099694 A1 * | 4/2018 | Scheibel | ................... | B60T 7/12 |
| 2018/0136653 A1 * | 5/2018 | Tao | ...................... | G05D 1/0055 |
| 2018/0229738 A1 * | 8/2018 | Nilsson | ............... | B60W 50/029 |
| 2018/0308296 A1 * | 10/2018 | Dan | ....................... | G07C 5/008 |
| 2018/0346014 A1 * | 12/2018 | Beyerlein | ........... | B62D 5/0409 |
| 2019/0108768 A1 * | 4/2019 | Mohamed | ................ | G09B 9/04 |

* cited by examiner

*Primary Examiner* — Mussa A Shaawat
(74) *Attorney, Agent, or Firm* — Dickinson Wright PLLC

(57) ABSTRACT

One or more embodiments are described herein of a controller system in a steering system. The controller system includes a first electric control unit (ECU) that operates as a primary ECU of the controller system, the primary ECU sending a motor command to a motor to generate torque. The controller system further includes a second ECU that operates as a backup for the first ECU. The operation as the backup includes monitoring the first ECU for a failure. In response to detecting the failure at the first ECU, the second ECU operates as the primary ECU of the controller system, and initiates a domain controller to operate as the backup ECU.

20 Claims, 7 Drawing Sheets

TRIPLE REDUNDANCY FAILSAFE FOR STEERING SYSTEMS

BACKGROUND

This application generally relates to steer-by-wire steering systems, and particularly to providing a triple redundancy failsafe for electronic control units (ECUs) operating the steering system in the vehicle.

Increasing reliance on automatic driving assist systems (ADAS) has resulted in one or more controllers of various subsystems in a vehicle to communicate with each other. For example, the communication facilitates the subsystems to share information, in turn facilitating a subsystem to react to actions being taken by other subsystems automatically.

In addition, increasing vehicle safety requirements are driving system redundancy to achieve higher safety levels. Redundancy is achieved by including a backup (or second) component for taking over operations in case a primary (or first) component experiences a failure. The redundant component(s) typically assume the burden of the operations of the EPS system for a limited amount of time.

Accordingly, it is desirable to have a robust inter-controller communication.

SUMMARY

According to one or more embodiments, system for triple redundancy failsafe for a steering system is described. An example system includes a controller module. The controller module includes a first electric control unit (ECU) that operates as a primary ECU to send a motor command to a motor to generate torque. The controller module further includes a second ECU that operates as a backup for the first ECU. In response to a failure at the first ECU, the second ECU sends a notification to a domain controller of the failure, and operates as the primary ECU. The system further includes the domain controller that operates as a backup for the second ECU in response to receiving the notification of the failure.

One or more embodiments of a steering system are also described herein. An example steering system includes a controller module. The controller module includes a first electric control unit (ECU) that operates as a primary ECU to send a motor command to a motor to generate torque. The controller module further includes a second ECU that operates as a backup for the first ECU. In response to a failure at the first ECU, the second ECU sends a notification to a domain controller of the failure, and operates as the primary ECU. The second ECU further initializes the domain controller to operate as a backup for the second ECU in response to receiving the notification of the failure.

Further, one or more embodiments are described herein of a controller system in a steering system. The controller system includes a first electric control unit (ECU) that operates as a primary ECU of the controller system, the primary ECU sending a motor command to a motor to generate torque. The controller system further includes a second ECU that operates as a backup for the first ECU. The operation as the backup includes monitoring the first ECU for a failure. In response to detecting the failure at the first ECU, the second ECU operates as the primary ECU of the controller system, and initiates a domain controller to operate as the backup ECU.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
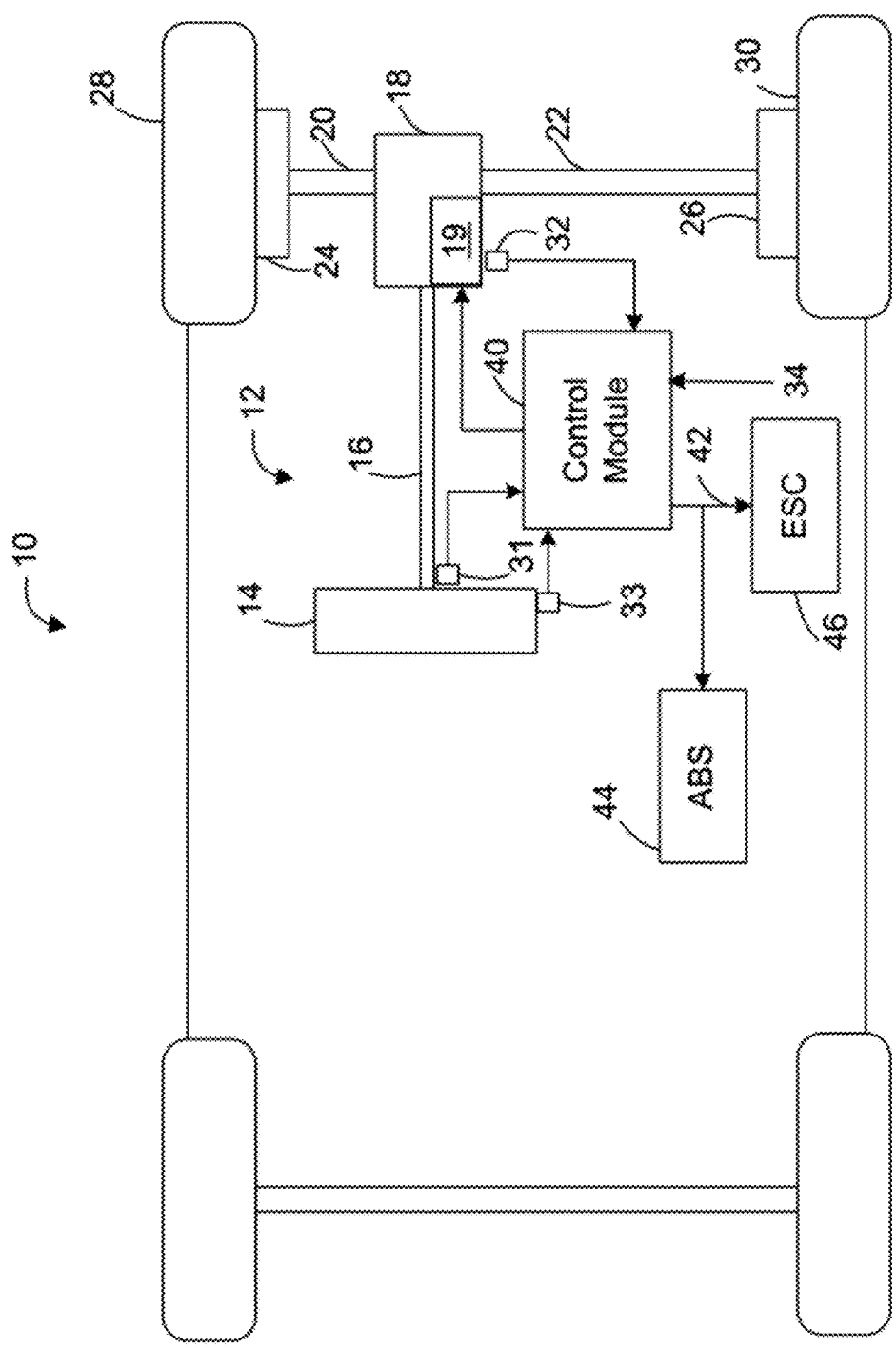
FIG. 1 illustrates a vehicle including a steering system, according to one or more embodiments.

Referring now to the Figures, where the invention will be described with reference to specific embodiments, without limiting same, FIG. 1 is an exemplary embodiment of a vehicle 10 including a steering system 12 is illustrated. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface friction level 42 as a control signal that can be used to control aspects of the steering system 12 through the steering assist unit 18. The surface friction level 42 can also be sent as an alert to an ABS 44 and/or ESC system 46 indicating a change in surface friction, which may be further classified as an on-center slip (i.e., at lower handwheel angle) or an off-center slip (i.e., at higher handwheel angle) as further described herein.

Communication with the ABS 44, ESC system 46, and other systems (not depicted), can be performed using, for example, a controller area network (CAN) bus or other vehicle network known in the art to exchange signals such as the vehicle speed signal 34. In one or more examples, hardware limitations and diversification of communication channels drive the inter-micro communication links to use different protocols, for example CAN, Serial Communications Interface (SCI), Multi-Processor Link Interface (MLI), among others. Each protocol may satisfy a portion of the safety aspects of data handling, but does not inherently ensure all safety aspects are covered.

Further, in one or more examples, the steering system 12 may be a steer by wire (SBW) type steering system that does not include any mechanical linkages between the handwheel 14 and the road wheels 28, 30, which are replaced with sensors, actuators, and electronics. For example, in a conventional steering system, which includes a steering wheel, a steering column, a power assisted rack and pinion system, and tie rods, the driver turns the steering wheel which, through the various mechanical components, causes the road wheels of the vehicle to turn. In the steer-by-wire system, a number of the mechanical components between the steering wheel and the road wheels of the vehicle are replaced with a sensor at the steering wheel and both sensors and actuators at the road wheels, and the rotation of the steering wheel is measured by the sensor. This rotation measurement is processed by the electronics to generate command signals for the actuators to turn the road wheels. Driver feedback in the form of steering torque that is designed to represent the feel of the road is provided by torque and rotation servo-actuators with software that provide simulation of driving conditions for the driver.

Figure 2:
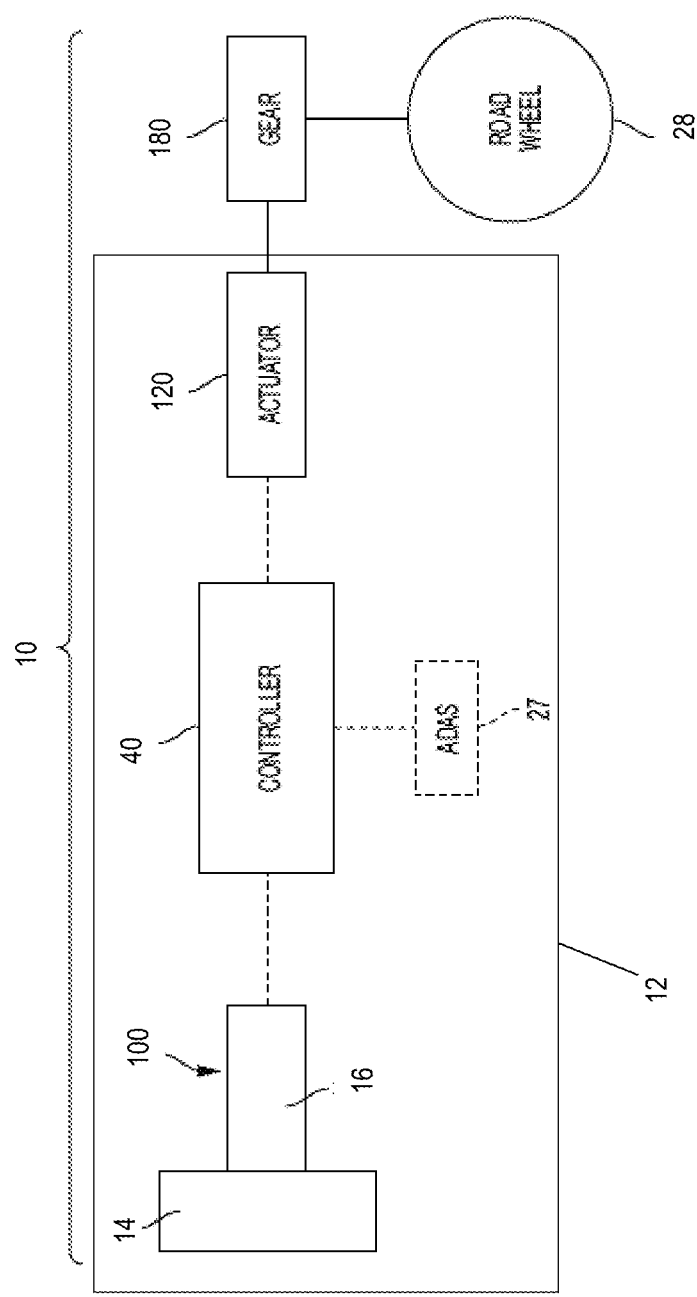
FIG. 2 illustrates a block diagram of the vehicle 10 equipped with a SBW type steering system 12 according to one or more embodiments.

FIG. 2 depicts a block diagram of the vehicle 10 equipped with a SBW type steering system 12 according to one or more embodiments. The steering system 12 may be an autonomous or semi-autonomous vehicle 100 having a steer-by-wire system. It will be appreciated that the steer-by-wire steering system 12 shown and described can be used in an autonomous or semi-autonomous vehicle or in a more conventional vehicle. The torque feedback system 100 provides a cost-effective torque feedback system for steer-by-wire vehicle 10, which includes the controller 40. Although not required, the controller 40 may also be associated with an autonomous or semi-autonomous vehicle utilizing an advanced driver assistance system ("ADAS") 27, thus converting a conventional steer-by-wire vehicle into an autonomous or semi-autonomous vehicle. The ADAS system 27 may utilize a navigation system that enables the vehicle 10 and its passengers to drive portal-to-portal without ever having the operator steer the vehicle 10. When the ADAS system 27 is activated, the steering wheel 14 is not required for control of the vehicle 10, and therefore, rotation of the steering wheel 14 is not required during the autonomous driving mode.

The steer-by-wire vehicle 10 does not include a mechanical connection between the steering wheel 14 and a steering gear 180, such as electric power steering gear, which is operatively coupled to a plurality of road wheels 28, 30. However, the steering wheel 14 and steering gear 180 are electrically coupled. Guidance of the vehicle 10 is performed by use of the steering gear 180, with an input shaft that is rotated by an actuator 120, such as a servo actuator. In one or more examples that include the ADAS system 27, in a non-active mode of the ADAS system 27, the actuator 120 receives an electronic communication signal of rotation of the steering wheel 14 by the driver.

The ADAS system 27 is activated when an autonomous vehicle driving condition is desired, thereby deactivating directional control of the road wheels 28, 30 by the steering wheel 14. The driver is able to switch between the autonomous vehicle driving condition and a non-autonomous vehicle driving condition.

The non-autonomous vehicle driving condition (non-active mode of ADAS system 27, if ADAS system 27 is included) includes a driver controlling the steering wheel 14 to directionally control the vehicle 10. As noted above, in a non-active mode of the ADAS system 27, the actuator 120 receives an electronic communication signal of rotation of the steering wheel 14 by the driver. However, due to the lack of mechanical connection between the steering wheel 14 and the road wheels 28, 30, the driver is not provided with a feel for the road without torque feedback. In one or more examples, the torque system 100 may include a servo actuator coupled to the steering column 16 and steering wheel 14 to simulate the driver's feel of the road. The torque system 100 may apply tactile feedback in the form of torque to the steering wheel 14 and are coupled to the steering wheel 14 and/or the steering column 16. It should be noted that in one or more examples, the torque feedback system 100 may provide the tactile feedback using any other components in lieu of another servo actuator coupled to the steering column 16 and steering wheel 14 to provide tactile feedback in the form of torque to the steering wheel 14 to simulate the driver's feel of the road.

Aspects of embodiments described herein may be performed by any suitable control system and/or processing device, such as the control module 26. In one embodiment, the control module 26 is or is included as part of an autonomous driving system. The control module 40 may be an ECU. The vehicle 10 includes additional ECUs. The control module 40 receives information from the other ECUs, such as the vehicle speed signal 34, the sensor information, and various other information. As described earlier, there are multiple communication methods designed for inter-micro communication, such as the protocols SCI, CAN, and MLI, among others. Each protocol may satisfy a portion of the safety aspects of data handling, but does not inherently ensure that all safety aspects are covered.

In one or more examples, the control module 40 is an ECU operated by a real time operating system (RTOS). It should be noted that while a steering system 12 operated by an ECU is depicted here, the technical solutions described herein are applicable in various other settings, such as in other ECUs that operate other components of the vehicle 10, for example, engine, exhaust system, tire pressure monitor system, infotainment system, among others. Increasing vehicle safety requirements are driving system redundancy to achieve higher safety levels. Redundancy is typically achieved by proliferation of control system, to the extent of having redundant microcontrollers.

Figure 3:
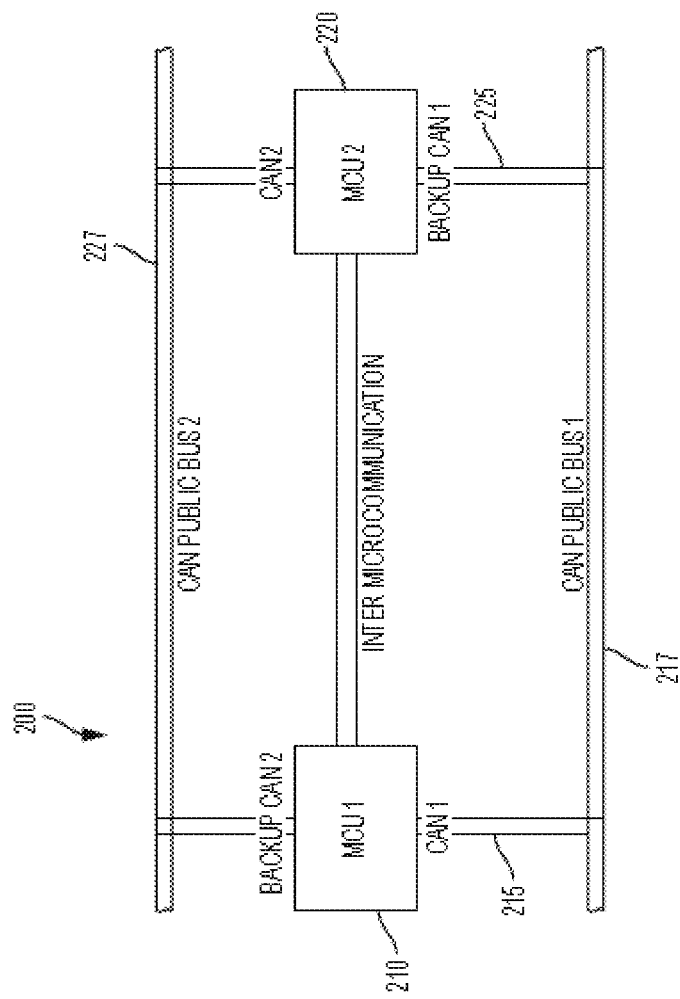
FIG. 3 illustrates an example redundant microcontroller unit (MCU) system according to one or more embodiments.

FIG. 3 illustrates an example redundant microcontroller unit (MCU) system according to one or more embodiments. The depicted MCU system 200 is depicted in a context of the vehicle 10, where communication to/from the MCU architecture 200 is performed using one or more controller area network (CAN) buses. Further, in the illustrated MCU architecture 200, two microcontrollers are used to provide redundancy. It should be noted that in other implementations the MCU system 200 can include additional microcontrollers. The MCUs of the MCU system 200 are internally connected by an inter-micro communication (IMC) to share information among each other, such as status information.

In the depicted example, MCU-2 220 acts as a backup for the MCU-1 210, and vice versa, during CAN communication failure. Accordingly, other nodes that are connected via the CAN bus continue receiving information (that is, ensuring data availability to the other nodes) from the MCU architecture 200. Typically, the MCU that owns a CAN communication in a particular bus is referred to as a source MCU and the MCU that provides backup for the CAN communication is referred to as the backup MCU. A source MCU of one bus will act as the backup ECU for the other bus.

For example, in FIG. 2, consider a first case where the MCU-1 210 is the source MCU that owns communication over CAN bus-1 215, and the MCU-2 220 is the backup MCU for the communication that it receives via CAN bus-2 225. In another case the MCU-2 220 is the source MCU that owns communication over the CAN bus-2 225, and the MCU-1 210 is the backup MCU with communication received via the CAN bus-1 215. The CAN bus-1 215 and the CAN bus-2 225 are connected to corresponding public CAN buses, public CAN bus-1 217 and public CAN bus-2 227.

The CAN communication may be stopped because of a failure such as an issue with a CAN transceiver, an MCU power down, an MCU reset due to failure, a disconnection in CAN bus line locally at the MCU, a short in a CAN bus line locally at the MCU, an application specific disabling of CAN communication, and the like. It is understood that the above are a few examples, and that the CAN communication may be interrupted by other failures. The back-up MCU sends CAN messages in the event of failure of the other primary MCU.

Further, in a similar manner, for implementing a fully redundant system, typical steering systems include 2 redundant sensors for position detection, redundant solid state driver circuits for motor actuation, redundant windings of a motor, and redundant battery supply, among other redundant components.

Figure 4:
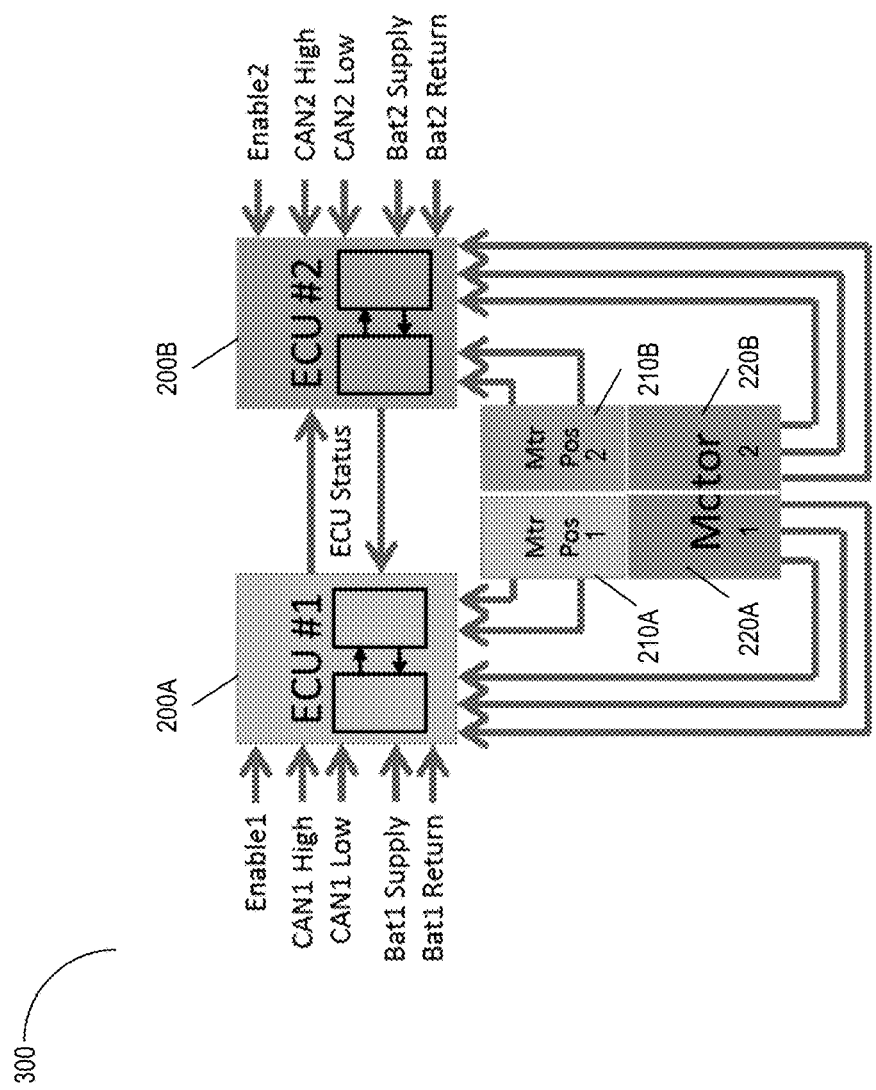
FIG. 4 illustrates an example fully redundant system according to one or more embodiments.

FIG. 4 depicts an example fully redundant system according to one or more embodiments. As depicted, two ECUs 200A and 200B operate using corresponding motor position sensors 210A and 210B, which in turn respectively monitor position of motors 220A and 220B. The motors 220A and 220B generate torque that is used as assist torque to maneuver the vehicle 10 and/or the feedback torque to provide feedback to the driver. In such a system 300, upon a single point failure in any of the components, the failing component is switched off. The remaining operational components assume the burden of the steering control.

Typically, in such scenarios, the steering system 12 may be operated for a limited duration after such a failure, because the system is now operating without redundancy. For example, the limit may be set based on an amount of time since the failure is detected and/or a number of miles driven since the failure is detected. Such limitations can inconvenience the driver/passengers of the vehicle 10. Further yet, in one or more examples, stopping operation of the vehicle in the preconfigured limit may not be practically possible, for example, in conditions where repair time is long, and the like. Accordingly, a technical challenge exists to create another layer of redundancy upon detecting a failure condition in a redundant system, such as the steering system 12.

The technical solutions described herein address such a technical challenge, among others that will be evident to reader skilled in the art, to create an additional layer of redundancy that enables driver/passengers of a vehicle the completion of a journey after a single point error has occurred in a system that is to be operated in a full-redundancy manner, such as the steering system.

In one or more examples, the technical solutions described herein utilizes additional domain ECUs that are in the vehicle 10 that operate under L3 according to SAE 2016. In one or more examples, the technical solutions facilitate a vehicle manufacturer, operator, service person, or other users to configure which ECU from the vehicle 10, for example, a chassis domain controller, an ADAS motion controller, or from any other vehicle subsystem, is to be used as an additional layer of redundancy case of a single point failure in the steering system 12.

"Domain Controllers" are controllers in the vehicle 10 that host and integrate modules from different suppliers. For example, a domain controller may integrate, for example using sensor fusion, software modules that were engineered by multiple different vendors to perform functions such as lane assist, parking pilot, cruise control, and the like. Sensor fusion is combining of sensory data or data derived from disparate sources such that the resulting information has less uncertainty than when these sources were used individually. For example, the domain controller may receive sensory data, such as measurements and or control signals from sensors like a front camera, a surround view system, a radar, a laser, an ultrasonic nano-radar, and the like. The domain controller may use sensor fusion using such input data to perform the one or more functions described above.

The technical solutions described herein facilitates using the domain controller of the vehicle 10 to provide an additional layer of redundancy, in the above example a triple redundancy, which is triggered when upon a single point failure in one of the components of the steering system 12.

Figure 5:
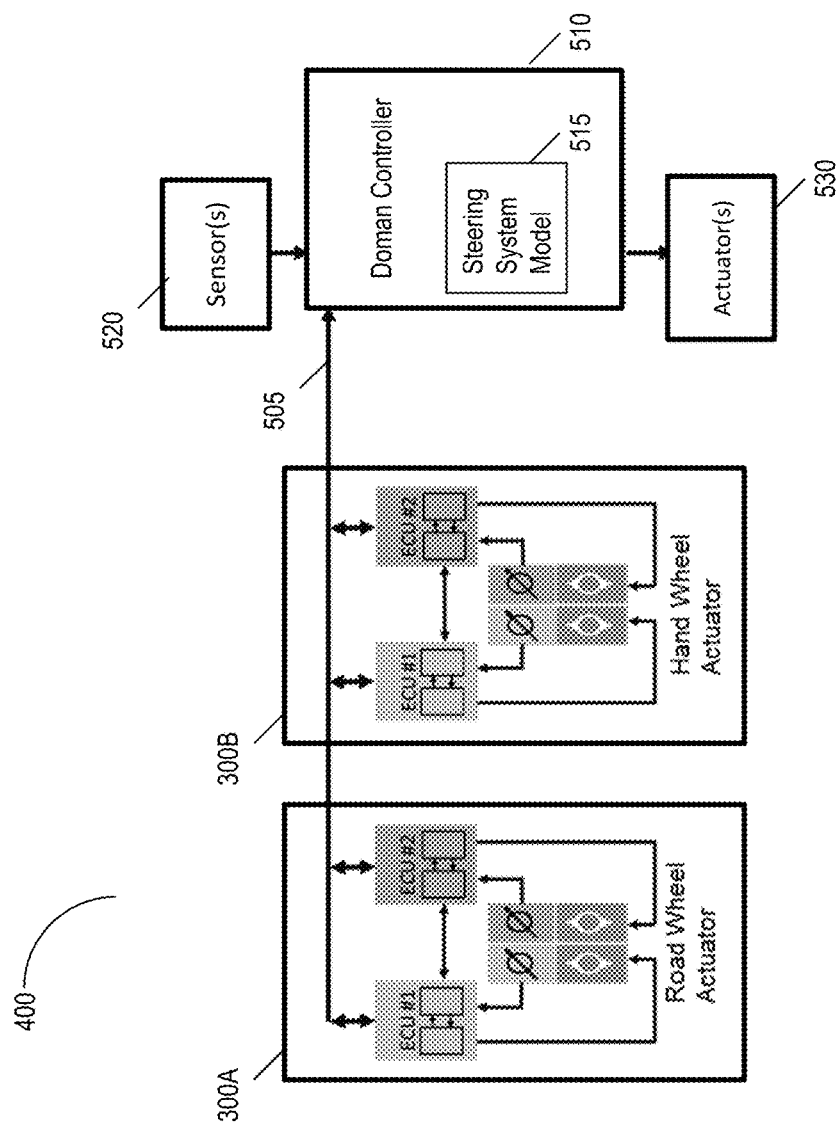
FIG. 5 depicts a block diagram for an example system providing additional redundancy layer according to one or more embodiments.

FIG. 5 depicts a block diagram for an example system providing additional redundancy layer according to one or more embodiments. In the depicted system 400, a SBW type steering system is depicted that includes a first controller, road wheel actuator controller 300A being used to operate the road wheel actuator in a full-redundancy mode. The steering system further includes and a second controller, a handwheel actuator controller 300B that is used to operate the handwheel actuator in full-redundancy mode.

Each of the controllers 300A and 300B are connected with each other using a high speed communication bus 505, for example a high speed serial communication bus. In one or more examples, the high speed communication bus 505 may be a Gigabit Ethernet bus, a high speed CAN bus, or any other such communication bus.

In one or more examples, the information contained on communication bus 505 includes a desired steering position as provided by the hand wheel actuator controller 300B and an actual position as provided by the road wheel actuator controller 300A. In a failure-free operation, a primary ECU from the redundant ECUs within the road wheel actuator controller 300A receives various input signals and generates the output torque command to cause the road wheel actuator to maneuver the road wheel 28, 30. Similarly, in the failure-free operation, a primary ECU from the redundant ECUs within the handwheel actuator controller 300B receives various input signals and generates the output torque command to cause the handwheel actuator to generate feedback torque at the handwheel 14. In the failure-free mode a domain controller 510 of the vehicle 10 is inactive with respect to the steering system operation, and does not perform any of the operations associated with generating assist torque and/or feedback torque using the road wheel actuator and/or the handwheel actuator, respectively.

In case of a failure, such as a single point failure, in the road wheel actuator controller 300A, a backup ECU from the redundant ECUs within the road wheel actuator controller 300A takes over operation of the road wheel actuator. Similarly, in case of a failure in the handwheel actuator controller 300B, a backup ECU from the redundant ECUs within the handwheel actuator controller 300B takes over operation of the handwheel actuator.

Further, to address the technical challenge of creating an additional layer of redundancy in response to failure of one of the components in the steering system 12, the system 400 facilitates the domain controller 510 to provide a third layer of redundancy, in this case. In one or more examples, the domain controller 510 hosts a steering system model 515 (e.g. a bicycle model) that is fed with information from additional vehicle sensors 520 such as measurement signals for yaw, road wheel speeds etc. The steering system model 515 is an operational model for the steering system 12 that is preconfigured in the domain controller 510. The steering system model 515 varies according to the model of the steering system 12 used in the vehicle 10. The steering system model 515 estimates one or more torque commands, such as assist torque command, feedback torque command, and so on, based on the measurement control signals from the one or more sensors 520. In other words, the steering system model 515 simulates the operation of the steering system 12.

The domain controller 510, via the communication bus 505, receives status information, and other input data from the one or more sensors and/or MCUs from the road wheel actuator controller 300A and/or the handwheel actuator controller 300B. Further, the domain controller 510 sends control commands to the road wheel actuator and/or the handwheel actuator of the steering system 12. The domain controller 510 may send/receive data and/or control commands from/to additional vehicle actuators 530 such as from a brake system in the vehicle 10. The domain controller 510 uses the high speed communication bus 505 to communicate with the backup ECU from the road wheel actuator controller 300A and/or the handwheel actuator controller 300B to provide redundancy in case of the single point failure in the primary ECU of the controllers.

Thus, the domain controller 510 is inactive in controlling the steering system 12 when the road wheel actuator controller 300A and the handwheel actuator controller 300B are operating in failure-free mode. Once a failure is detected, in one or more of these controllers (300A/B), the controller(s) indicate to the domain controller 510 that a single point failure has occurred and that a backup ECU from the controller(s) has taken over operation of the corresponding controller(s). The domain controller 510 initiates the steering system model 515 and begins operating as a secondary backup of the ECU that has taken over control. Thus, because the operating ECU is now operating with redundancy, the steering system 12 can be operated further than limits that may have to be placed without the added redundancy.

If further failure occurs, the steering system 12 may be made inoperative after the predetermined limits, such as a limited duration, or a limited number of miles. Alternatively, or in addition, in case of the additional failure, the domain controller 510 performs an emergency maneuver to a safe stop, for example, by applying additional actuators like the brakes or a rear steer actuators. The emergency maneuver may include additional operations, such as starting emergency lights, providing notifications to the driver, service technician, manufacturer, or any other third party. Alternatively, or in addition, if an additional domain controller exists in the vehicle, the additional failure may trigger the additional domain controller to operate as the redundant ECU.

Figure 6:
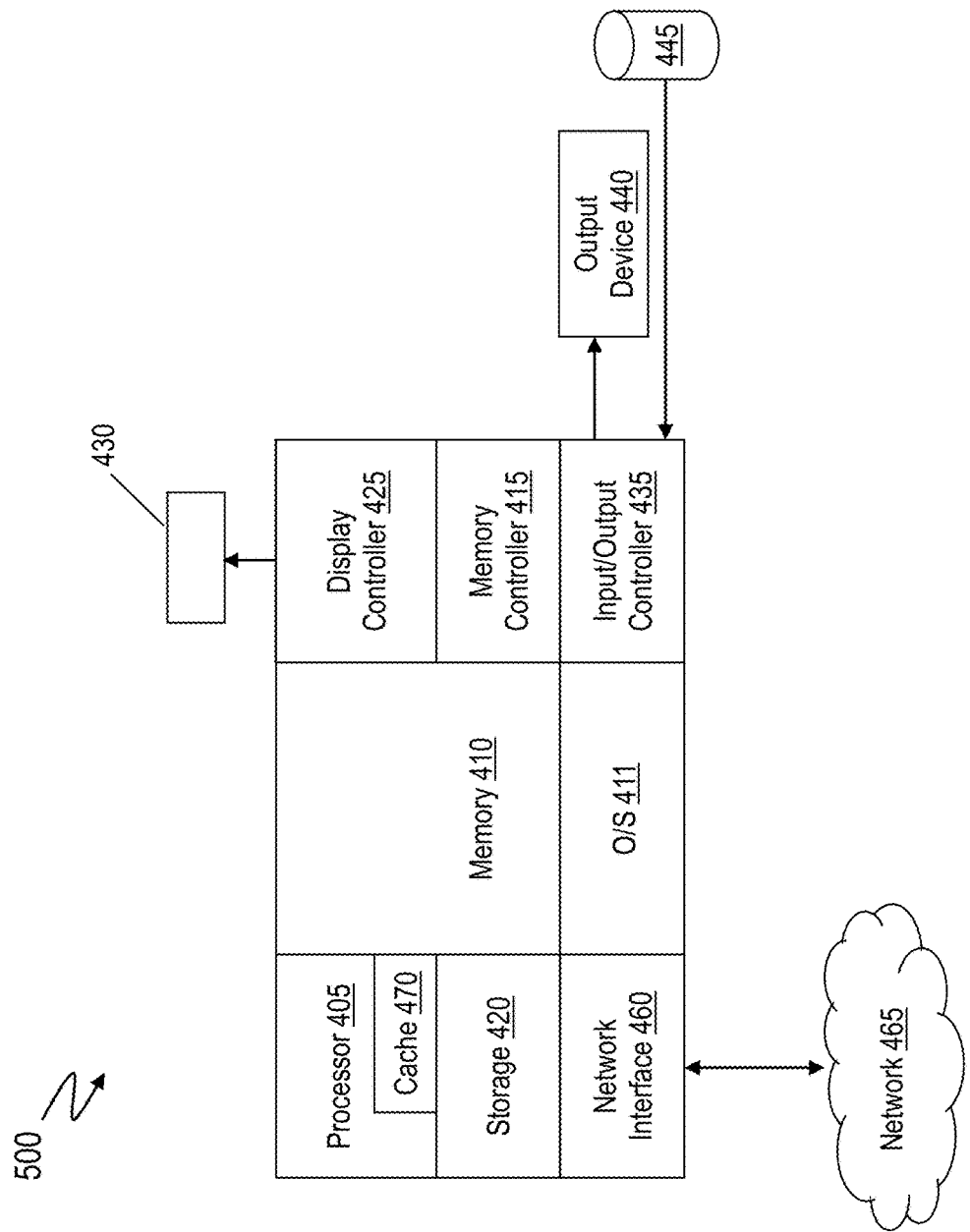
FIG. 6 depicts a communication system according to one or more embodiments.

FIG. 6 illustrates an example communication system 500 in a vehicle. The system 500 may be any of the ECUs or controllers, or such device described herein that communicates via an intra-vehicle network 465, such as using the CAN, SCI, MLI protocols. The system 500 includes hardware, such as electronic circuitry.

The system 500 includes, among other components, a processor 405, memory 410 coupled to a memory controller 415, and one or more input devices 445 and/or output devices 440, such as peripheral or control devices, which are communicatively coupled via a local I/O controller 435. These devices 440 and 445 may include, for example, battery sensors, position sensors (altimeter, accelerometer, GPS), indicator/identification lights and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the system 500, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, and so on.).

The memory 410 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services. In one or more examples, the OS 411 is a real-time operating system (RTOS).

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the systems and methods described herein.

The system 500 may further include a display controller 425 coupled to a user interface or display 430. In some embodiments, the display 430 may be an LCD screen. In other embodiments, the display 430 may include a plurality of LED status lights. In some embodiments, the system 500 may further include a network interface 460 for coupling to a network 465. The network 465 may be an IP-based network for communication between the system 500 and an external server, client and the like via a broadband connection. In an embodiment, the network 465 may be a satellite network. The network 465 transmits and receives data between the system 500 and external systems. In some embodiments, the network 465 may be a managed IP network administered by a service provider. The network 465 may be implemented in a wireless fashion, for example, using wireless protocols and technologies, such as WiFi, WiMax, satellite, or any other. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), an intra-vehicle network, intranet or other suitable network system and may include equipment for receiving and transmitting signals. The network may use one or more protocols such as the CAN, SCI, MLI, and the like.

Figure 7:
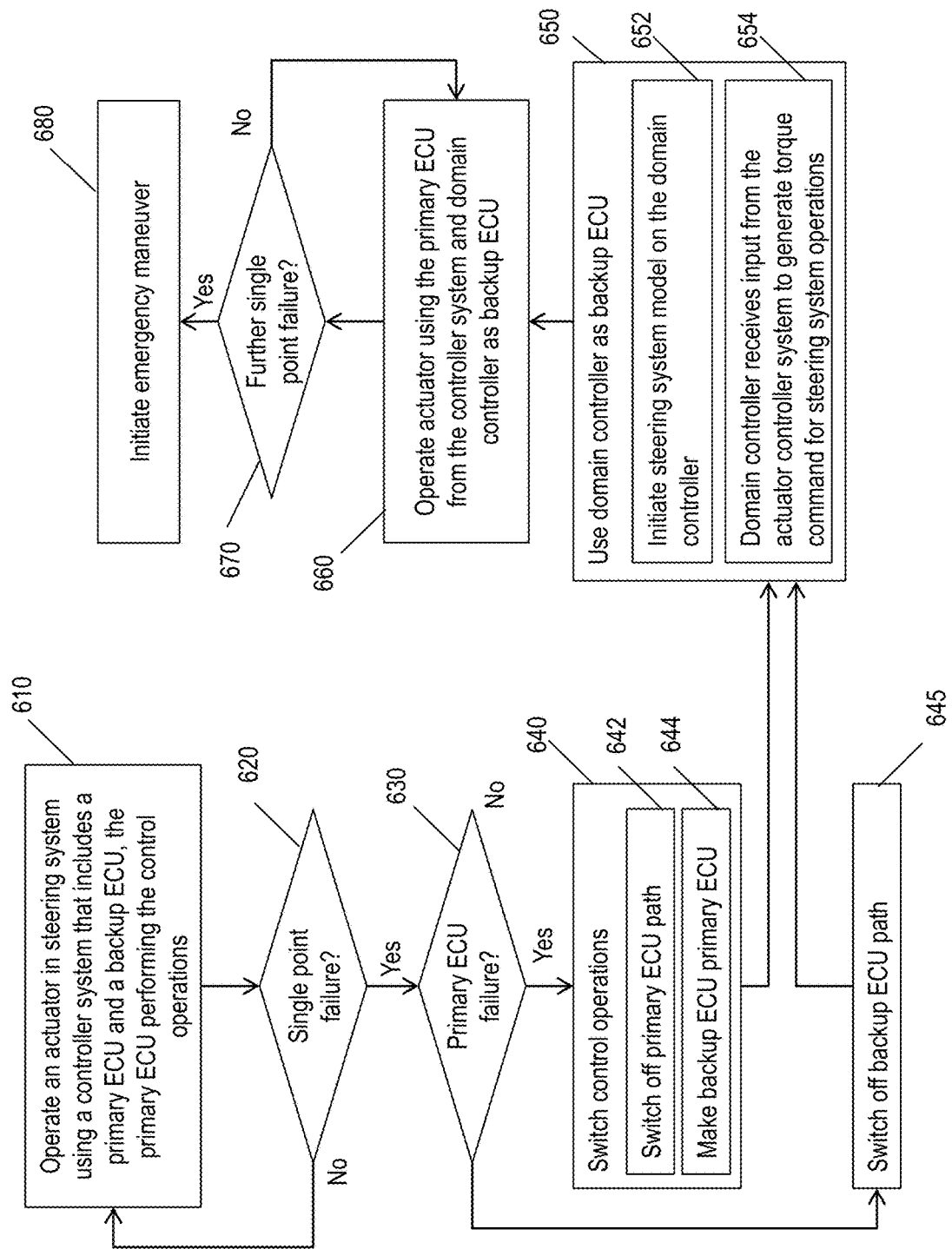
FIG. 7 illustrates an example flowchart of a method for facilitating additional layers of redundancy for a steering system according to one or more embodiments.

FIG. 7 illustrates an example flowchart of a method for facilitating additional layers of redundancy for a steering system according to one or more embodiments. The method includes operating an actuator in the steering system 12 using a controller system that includes a primary ECU and a backup ECU, the primary ECU performing the control operations for the actuator, as shown at 610. The actuator may be any one of the handwheel actuator or the road wheel actuator. The method further includes detecting if a single point has occurred, as shown at 620. The single point failure is determined if any one of the actuator controller systems experiences an error in operation. Until such a failure occurs, the operation of the actuators in the steering system 12 continues.

In response to detection of the failure, it is determined whether the primary ECU or the secondary ECU from the controller system experiences the failure, as shown at 630. Thus, which one of the two ECUs from the controller system failed is determined. If the primary ECU failed, the method includes switching control operations in the controller system, as shown at 640.

In one or more examples, the backup ECU detects the failure at the primary ECU by comparing a first road wheel position as computed by the primary ECU corresponding to a handwheel position and a second road wheel position as computed by the backup ECU corresponding to the same handwheel position. If the difference in the resulting road wheel positions exceeds a predetermined threshold, and if the sensors and other components of the backup ECU are not indicating signs of failure, the backup ECU determines that the primary ECU is failing. The primary ECU determines that the backup ECU is experiencing a failure in a similar manner. Alternatively, or in addition, the inter-micro communication between the ECUs facilitate the ECUs to notify each other of a failure, such as if the failure is because of a failed component, for example a position sensor.

Switching the control operations includes switching off the path of the primary ECU in the controller system, as shown at 642. Further, the backup ECU from the controller system is made the primary ECU of the controller system to perform the one or more control operations of the controller system, as shown at 644.

Alternatively, if the backup ECU of the controller system experiences the failure, the method includes switching off the path of the backup ECU in the controller system, as shown at 645.

The method further includes initiating and using the domain controller 510 as a new backup ECU of the controller system, as shown at 650. The domain controller 510 that is outside the steering system 12 thus facilitates providing redundancy to the controlling ECU of the controller system, that is the ECU that is now operating as the primary ECU.

Using the domain controller 510 as the backup ECU includes initiating the steering system model 515 on the domain controller 510, as shown at 652. The steering system model 515 is a preconfigured simulation model for the steering system 12 of the vehicle 10. The steering system model 515 is programmed to compute estimates of torque commands, such as the assist torque and/or the feedback torque that the actuators of the steering system 12 based on one or more sensor measurements. In one or more examples, the domain controller 510 receives the sensor measurements from the primary ECU from the controller system. Alternatively, or in addition, the domain controller 510 uses sensor measurements from one or more different sources, such as sensors that the domain controller 510 is in connection with.

Thus, using the steering system model 515, the domain controller generates torque command for steering system operations, as shown at 654.

The steering system 12 is thus operated using the primary ECU from the controller system and the domain controller 510 as the backup ECU until further single point failure in the controller system occurs, as shown at 660 and 670. The domain controller 510 thus provides an additional layer of redundancy in case of an ECU failure in the steering system 12.

The domain controller 510 detects the further failure at the primary ECU by comparing a first road wheel position as computed by the primary ECU corresponding to a handwheel position and a second road wheel position as computed by the domain controller 510 corresponding to a predicted handwheel position and a corresponding predicted road wheel position. In one or more examples, the domain controller 510 computes the predicted road wheel position based on other sensor data that the domain controller receives from sensors external to the steering system 12, such as from sensors from a braking system, wheel assembly system, and the like.

Further, in response to additional failure, that is the operating controller of the controller system experiencing a failure, the domain controller, which is operating as the backup controller, initiates emergency maneuver, as shown at 680.

The emergency maneuver may include bringing the vehicle 10 to a stop, for example, automatically sending braking commands to an actuator of the brake system of the vehicle 10, or to any other actuators in the vehicle 10. Further, the emergency maneuver may include additional actions such as sending notifications to one or more users (for example, driver, passenger, fleet manager, manufacture, service technician etc.), generating audio/visual notifications in the vehicle 10, and the like. In one or more examples, the driver is allowed to operate the vehicle 10 for a limited duration of time or for a limited distance prior to bringing the vehicle 10 to an automatic halt.

The technical solutions thus improve a redundancy in controller systems of the steering system by providing an additional layer of redundancy using the domain controller, which is external to the steering system, as a backup ECU in case of a single point failure in the controller system. The improvement allows an operator of the vehicle to travel with the vehicle for a longer duration or a farther distance than in the case where the single point failure results in the vehicle to be halted.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A system for triple redundancy failsafe for a steering system of a vehicle, the system comprising:
   a controller module comprising:
      a first electric control unit (ECU) configured to operate as a primary ECU to send a motor command to a motor to generate torque;
      a second ECU configured to operate as a backup for the first ECU; and
         in response to a failure of at the first ECU:
            send a notification to a domain controller of the failure; and
            operate as the primary ECU; and
   the domain controller that hosts a steering system model representing an operation model of the steering system, the domain controller being configured to initiate the steering system model to simulate operational behavior of the steering system and to operate as a backup for the second ECU using the steering system model in response to receiving the notification of the failure, wherein the domain controller receives various measurements from sensors of the vehicle and, using the steering system model, simulates the operational behavior of the steering system based on the various measurements, and wherein the sensors of the vehicle include one or more sensors corresponding to the steering system and one or more sensors corresponding to at least one other system of the vehicle.

2. The system of claim 1, wherein the domain controller is external to the steering system.

3. The system of claim 1, wherein the steering system model is configured to compute an estimated torque command when operating as the backup ECU.

4. The system of claim 1, wherein the second ECU detects the failure at the first ECU by comparing a first road wheel position as computed by the first ECU corresponding to a handwheel position and a second road wheel position as computed by the second ECU corresponding to the handwheel position.

5. The system of claim 1, wherein the domain controller detects the failure at the primary ECU by comparing a first road wheel position as computed by the primary ECU corresponding to a handwheel position and a second road wheel position as computed by the domain controller corresponding to a predicted handwheel position and a corresponding predicted road wheel position.

6. The system of claim 5, wherein, in response to the failure in the primary ECU the domain controller initiates an emergency maneuver to halt operation of the steering system.

7. The system of claim 1, the controller module controls a handwheel actuator of the steering system to generate feedback torque.

8. The system of claim 1, wherein the controller module controls a road wheel actuator of the steering system to generate assist torque.

9. The system of claim 1, wherein the first ECU is further configured to, in response to a failure of at the second ECU, send a notification to the domain controller of the failure, wherein the domain controller is initiated to operate as a backup for the first ECU in response to receiving the notification of the failure.

10. A steering system of a vehicle comprising:
a controller module comprising:
a first electric control unit (ECU) configured to operate as a primary ECU of the controller module, the primary ECU sending a motor command to a motor to generate torque;
a second ECU configured to operate as a backup for the first ECU, the operation as the backup comprising:
monitoring the first ECU for a failure;
in response to detecting the failure at the first ECU:
operating as the primary ECU of the controller module; and
initiating a domain controller to operate as the backup ECU, the domain controller being configured to:
host a steering system model representing an operation model of the steering system; and
initiate the steering system model to simulate operational behavior of the steering system to operate as the backup for the backup ECU using the steering system model, wherein the domain controller receives various measurements from sensors of the vehicle and, using the steering system model, simulates the operational behavior of the steering system based on the various measurements, and wherein the sensors of the vehicle include one or more sensors corresponding to the steering system and one or more sensors corresponding to at least one other system of the vehicle.

11. The steering system of claim 10, wherein the domain controller is external to the steering system.

12. The steering system of claim 10, wherein the first ECU is configured to, in response to a failure of at the second ECU, send a notification to the domain controller of the failure, wherein the domain controller is initiated to operate as a backup for the first ECU in response to receiving the notification of the failure.

13. The steering system of claim 10, wherein the second ECU detects the failure at the first ECU by comparing a first road wheel position as computed by the first ECU corresponding to a handwheel position and a second road wheel position as computed by the second ECU corresponding to the handwheel position.

14. The steering system of claim 10, wherein the domain controller detects the failure at the primary ECU by comparing a first road wheel position as computed by the primary ECU corresponding to a handwheel position and a second road wheel position as computed by the domain controller corresponding to a predicted handwheel position and a corresponding predicted road wheel position.

15. The steering system of claim 10, wherein in response to the failure in the primary ECU the domain controller initiates an emergency maneuver to halt operation of the steering system.

16. A controller system in a steering system, the controller system comprising:
a first electric control unit (ECU) configured to operate as a primary ECU of the controller system, the primary ECU sending a motor command to a motor to generate torque;
a second ECU configured to operate as a backup for the first ECU, the operation as the backup comprising:
monitoring the first ECU for a failure;
in response to detecting the failure at the first ECU:
operating as the primary ECU of the controller system; and
initiating a domain controller to operate as the backup ECU, wherein the domain controller receives various measurements from sensors corresponding to the steering system and at least one other system, and wherein the domain controller operates as a backup ECU using the various measurements.

17. The controller system of claim 16, wherein the first ECU is further configured to, in response to a failure of at the second ECU, send a notification to the domain controller of the failure, wherein the domain controller is initiated to operate as a backup for the first ECU in response to receiving the notification of the failure.

18. The controller system of claim 16, wherein the second ECU detects the failure at the first ECU by comparing a first road wheel position as computed by the first ECU corresponding to a handwheel position and a second road wheel position as computed by the second ECU corresponding to the handwheel position.

19. The controller system of claim 16, wherein the domain controller detects the failure at the primary ECU by comparing a first road wheel position as computed by the primary ECU corresponding to a handwheel position and a second road wheel position as computed by the domain controller corresponding to a predicted handwheel position and a corresponding predicted road wheel position.

20. The controller system of claim 16, wherein in response to the failure in the primary ECU the domain controller initiates an emergency maneuver to halt operation of the steering system.

* * * * *